US011620079B2

(12) United States Patent
Henson et al.

(10) Patent No.: US 11,620,079 B2
(45) Date of Patent: Apr. 4, 2023

(54) LOG STRUCTURED ARRAY OFFLOADED DATA TRANSFER MIGRATIONS

(71) Applicant: International Business Machines Corporation, Armonk, NY (US)

(72) Inventors: Wendy Lyn Henson, Portland, OR (US); Robert E. Jose, Beaverton, OR (US); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 17/242,675

(22) Filed: Apr. 28, 2021

(65) Prior Publication Data

US 2022/0350527 A1 Nov. 3, 2022

(51) Int. Cl.
*G06F 3/06* (2006.01)

(52) U.S. Cl.
CPC ............ *G06F 3/0656* (2013.01); *G06F 3/064* (2013.01); *G06F 3/0604* (2013.01); *G06F 3/065* (2013.01); *G06F 3/0647* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 5,799,324 A * | 8/1998 | McNutt | G06F 3/0689 |
| 6,237,021 B1 | 5/2001 | Drummond | |
| 6,895,468 B2 * | 5/2005 | Rege | G06F 11/1471 |
| | | | 711/6 |
| 6,941,420 B2 | 9/2005 | Butterworth et al. | |
| 7,660,866 B2 | 2/2010 | Chambliss et al. | |
| 8,935,493 B1 | 1/2015 | Dolan et al. | |
| 10,831,727 B2 | 11/2020 | Bavishi et al. | |
| 2005/0071550 A1 | 3/2005 | Lowe et al. | |
| 2014/0136575 A1 | 5/2014 | Zhao et al. | |
| 2014/0136884 A1 | 5/2014 | Werner et al. | |
| 2016/0357437 A1 * | 12/2016 | Doerner | G06F 3/0613 |
| 2021/0216569 A1 * | 7/2021 | David | G06F 3/0658 |

* cited by examiner

*Primary Examiner* — Michael Alsip
(74) *Attorney, Agent, or Firm* — Matthew Zehrer (57) ABSTRACT

A storage system includes a controller and block-based storage device(s) that include LSA blocks arranged as a log structured array (LSA). The controller creates a first and second LUN, each including LBA locations. The controller assigns the first LUN to a first host and the second LUN to a second host, accumulates first host data associated with a first LBA location of the first LUN, writes a block-size worth of such data to a first LSA block, and maps the first LBA location to the first LSA block. In response to receiving an ODX Copy Offload instruction, the controller determines the first host data should be migrated to a target LBA location in the second LUN, determines the first and second LUN are exclusively mappable to the same LSA, maps the target LBA location to the first LSA block, and unmaps the first LBA location from the first LSA block.

20 Claims, 6 Drawing Sheets

LOG STRUCTURED ARRAY OFFLOADED DATA TRANSFER MIGRATIONS

BACKGROUND

Various embodiments of the present application generally relate to the field of managing data on data storage devices. More specifically, various embodiments of the present application relate to performing offloaded data transfer data migration operations within a log structured array (LSA).

SUMMARY

In an embodiment of the present invention, a storage system controller is presented. The controller includes one or more processors, a host interface, a storage device interface, one or more processors, and a memory. The host interface includes a buffer and is configured to couple the storage system controller to a first host and to a second host. The storage device interface is configured to couple the storage system controller to a plurality of block-based storage devices, each with a plurality of blocks. A group of blocks (LSA blocks) are arranged to store data as a log structured array (LSA). The memory stores instructions, which, when executed by the one or more processors, causes the storage controller to perform the following operations: dividing each of the plurality of block-based storage devices into a first logical unit (LUN) and a second LUN, the first LUN and the second LUN each including a plurality of logical block addressing (LBA) locations; assigning the first LUN to store data exclusively from the first host and assigning the second LUN to store data exclusively from the second host; accumulate, within the buffer, first host write data associated with a first LBA location of the first LUN; write a block-size worth of the first host data to a first LSA block that which is pointed to by a LSA block pointer; move the LSA block pointer to a sequential LSA block that neighbors and is sequential to the first LSA block; map the first LBA location in the first LUN to the first LSA block; in response to receiving an ODX Copy Offload instruction from the first host, determine the first host data that is stored at the first LSA block and mapped to the first LBA location should be migrated to a target LBA location in the second LUN and determine the first LUN and the second LUN are exclusively mappable to the LSA; map the target LBA location in the second LUN to the first LSA block; and unmap the first LBA location in the first LUN from the first LSA block.

In another embodiment, a storage system controller method is presented. The method includes dividing each of a plurality of block-based storage devices into a first logical unit (LUN) and a second LUN. The first LUN and the second LUN each include a plurality of logical block addressing (LBA) locations. The method includes assigning the first LUN to store data exclusively from a first host and assigning the second LUN to store data exclusively from a second host. The method includes accumulating within a buffer first host write data associated with a first LBA location of the first LUN. The method includes writing a block-size worth of the first host data to a first log structured array (LSA) block that which is pointed to by a LSA block pointer. A group of LSA blocks are arranged to store data as a LSA. The method includes moving the LSA block pointer to a sequential LSA block that neighbors and is sequential to the first LSA block. The method includes mapping the first LBA location in the first LUN to the first LSA block. The method includes, in response to receiving an ODX Copy Offload instruction from the first host, determining the first host data that is stored at the first LSA block and is mapped to the first LBA location should be migrated to a target LBA location in the second LUN and determining the first LUN and the second LUN are exclusively mappable to the LSA. The method includes mapping the target LBA location in the second LUN to the first LSA block and unmapping the first LBA location in the first LUN from the first LSA block.

In another embodiment, a computer program product to reduce hole formation within a log structured array (LSA), due to ODX Copy Offload data migration operations, is presented. The computer program product includes a computer readable storage medium that includes program instructions embodied therewith. The program instructions are readable to cause a processor to divide each of a plurality of block-based storage devices into a first logical unit (LUN) and a second LUN. The first LUN and the second LUN each include a plurality of logical block addressing (LBA) locations. The program instructions are readable to cause the processor to assign the first LUN to store data exclusively from a first host, assign the second LUN to store data exclusively from a second host, and accumulate within a buffer first host write data associated with a first LBA location of the first LUN. The program instructions are readable to cause the processor to write a block-size worth of the first host data to a first LSA block of the LSA that which is pointed to by a LSA block pointer. A group of LSA blocks are arranged to store data as a LSA. The program instructions are readable to cause the processor to move the LSA block pointer to a sequential LSA block that neighbors and is sequential to the first LSA block and map the first LBA location in the first LUN to the first LSA block. The program instructions are readable to cause the processor to, in response to receiving an ODX Copy Offload instruction from the first host, determine the first host data that is stored at the first LSA block and is mapped to the first LBA location should be migrated to a target LBA location in the second LUN and determine the first LUN and the second LUN are exclusively mappable to the LSA. The program instructions are readable to cause the processor to map the target LBA location in the second LUN to the first LSA block and unmap the first LBA location in the first LUN from the first LSA block.

These and other embodiments, features, aspects, and advantages will become better understood with reference to the following description, appended claims, and accompanying drawings.

BRIEF DESCRIPTION OF THE DRAWINGS

In accordance with common practice, the various features illustrated in the drawings may not be drawn to scale. Accordingly, the dimensions of the various features may be

DETAILED DESCRIPTION

The proliferation of computers and computing systems has resulted in a need for efficient and reliable storage of data. Host computing devices make use of data storage devices of many types and complexities to satisfy the growing data storage needs. The types of data storage devices commonly used range from individual flash memory devices and hard drives to data storage systems and clusters of storage systems. A data storage system (storage system) is a specialized computer that provides storage services related to the organization and storage of data, to one or more hosts and/or clients. The data is typically stored on writable persistent storage media, such as non-volatile memories and disks. A storage system is configured to operate according to a client/server model of information delivery and may enable many clients or applications to access the data served by the system. A storage system can employ a storage architecture that serves the data with both random and streaming access patterns at either a file level, as in network attached storage (NAS) environments, or at the block level, as in a storage area network (SAN).

The management of data on data storage devices often includes copying data from one storage location to another. In addition, data is sometimes copied from one location in a storage device or storage system to another location within that same storage device or the same storage system. A traditional method for a host to perform this type of copy operations is for the host to read the data from the source storage device into the memory of the host and then transfer the data to the destination storage location, under the control of the host.

While the host-centered copy process described above may work well if the host has available bandwidth and/or the quantity of data is relatively small, the burdens associated with copying data in this manner can become significant in some cases. In addition to consuming processing complex resources of the host, if the data is transferred over a network, network bandwidth is unnecessarily consumed because the data is first transmitted to the host and then from the host to the destination. Copy offload processes allow these types of data transfers to occur in a more efficient manner by transferring data directly between storage devices, for example one disk drive to another. In some cases, these types of copy offload processes are referred to as offloaded data transfer (ODX).

ODX is defined for Microsoft Windows. In ODX, a host transmits a request to a source storage device or source storage system identifying data to be copied. The host receives a token representing the data of interest from the storage device. The token does not contain the data but acts as a unique identifier and/or locator for the data. The host then uses an offload write command, including the token, to request data movement from the source to a destination storage location. ODX is designed to work with storage devices which implement the Small Computer System Interface (SCSI) standard. Specifically, Windows ODX features are supported in device which implement SCSI Primary Commands-4 (SPC-4) and SCSI Block Commands-3 (SBC-3). These commands are defined by the T10 committee. T10 is a technical committee of the International Committee on Information Technology Standards (INCITS) and is responsible for SCSI architectural standards and storage interfaces. ODX may also be used in other operating environments and in conjunction with other operating protocols such as Common Internet File System (CIFS).

In ODX described above, the token is used to initiate copying of the data from one location to another. The token may also be transferred or exchanged among various hosts. When the token is provided to the destination storage device, a copy of the associated data is transferred directly to the destination device. The transfer process occurs through communication between the source and the destination devices without the data having to flow through the host and without the host managing the data transfer process.

In ODX, copying of the data from one location to another may be related to a data copy operation or a data migration operation. In the data copy operation, data at the source is retained at the source and is also reproduced at the target. In the data migration operation, data is not retained at the sourced and is reproduced at the target. This type of data copy in ODX is generally referred to as Offload Copy. To distinguish between the different data copy and the data migration operations, ODX also adds an UNMAP source instruction from the host to identify that the data migrated from the source to the target need not be retained. As such, a typical ODX for data migration is initiated by an Offload Copy instruction followed up by the UNMAP source instruction from the host.

In some implementations, the data migration operation involves migrating data from a source location in a LSA to a target location in the same LSA. Once the data is copied to the target location, the host sends the UNMAP instruction and the source location is unmapped and one or more empty positions, or holes, are created in the LSA. These holes are generally not able to be utilized for further data storage until known garbage collection operations are completed. As the number of holes within an LSA increase, the number of host I/O penalties and/or the complexity of host I/O also increase. Therefore, and ODX Offload Copy data migration operation that reduces the propensity of hole formation within LSAs is presented.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, circuits, or the like, have not been described in exhaustive detail so as not to unnecessarily obscure more pertinent aspects of the embodiments described herein.

Figure 1:
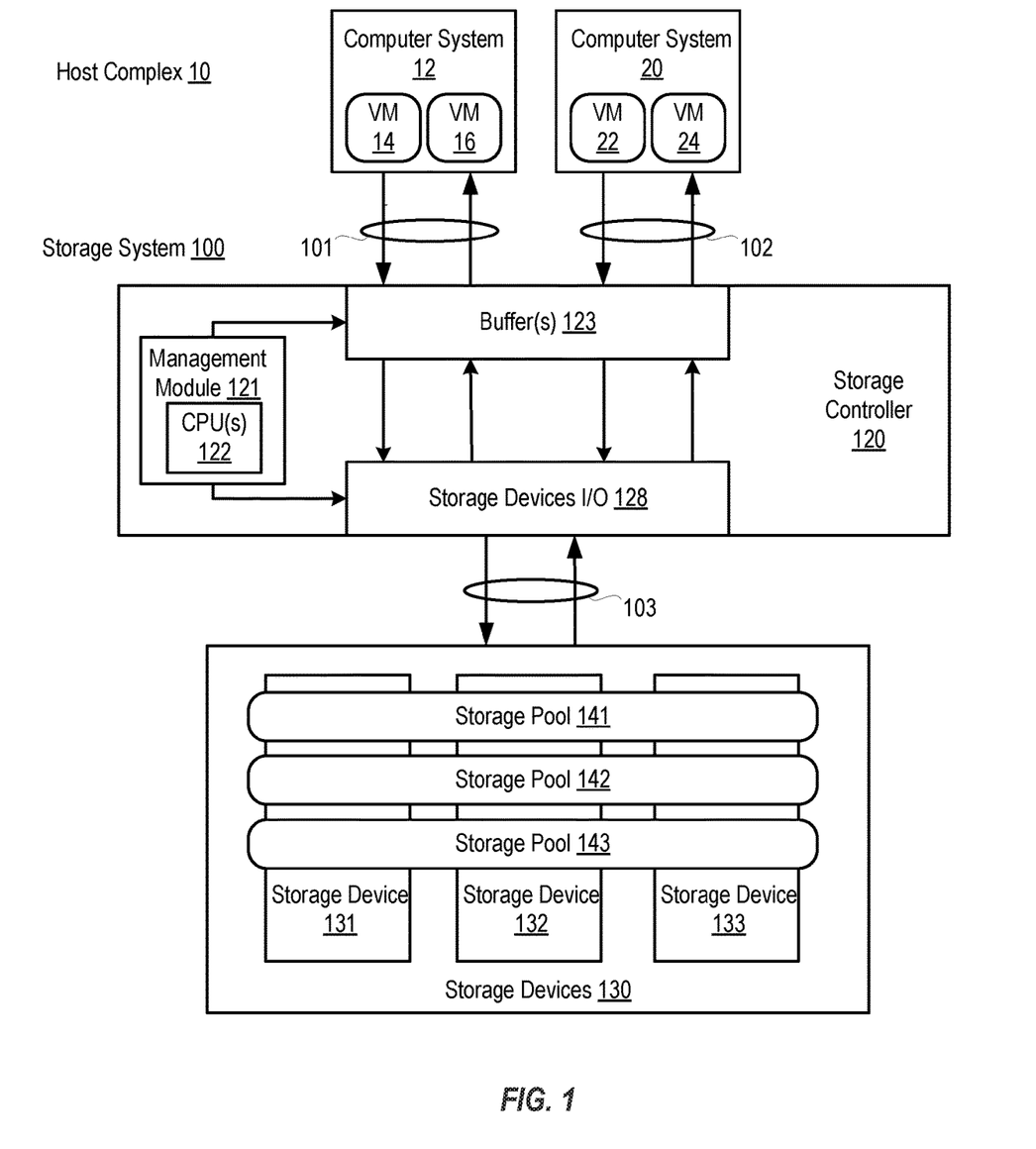
FIG. 1 is a block diagram illustrating an implementation of a storage system in accordance with some embodiments.

FIG. 1 is a diagram of an implementation of a storage system 100, in accordance with some embodiments. While some example features are illustrated, various other features have not been illustrated for the sake of brevity and so as not to obscure more pertinent aspects of the example embodiments disclosed herein. To that end, as a non-limiting example, data storage system 100 includes a storage controller 120, and a storage devices 130, and is used in conjunction with a host complex 10. In some embodiments, storage devices 130 is a single block-based storage device while in other embodiments storage devices 130 includes a plurality of block-based storage devices. In some embodiments, storage devices 130 may also include other types of storages devices. In some embodiments, storage devices 130 includes one or more NAND-type flash storage devices, one or more NOR-type flash storage devices. However, other types of storage devices may be included in accordance with aspects of a wide variety of embodiments (e.g., PCRAM, ReRAM, STT-RAM, etc.). In some embodiments, a flash storage device includes one or more flash memory die, one or more flash memory packages, one or more flash memory channels, one or more solid state disk (SSD)s, one or more SSD arrays, or the like.

Host complex 10 includes two or more distinct or discrete hosts. The term host is defined herein to be a physical computer or virtual machine (VM) communicatively connected to storage system 110 and is configured so that the host writes data to and reads data from storage system 110. In some embodiments, host complex 10 is communicatively connected to storage system 110 by a known network.

A host may be a physical computer system 12, 20 such as a server, a computer, a laptop computer, a tablet device, a netbook, an internet kiosk, a personal digital assistant, a mobile phone, a smart phone, a gaming device, or any other computing device. Similarly, a host may be a VM 14, 16, 22, 24. A VM is a virtual machine (VM) environment that functions as a virtual computer with its own virtual computing resources created on a physical computer system. Typically, software separates the physical computer system's resources and provisions them appropriately so they can be used by each VM. In the depicted example, VM 14 and VM 16 function as discrete virtual computers with their own virtual computing resources created on physical computer system 12, VM 22 and VM 24 function as discrete virtual computers with their own virtual computing resources created on physical computer system 20.

In some embodiments, physical computer system 12, 20 each include one or more processors, one or more types of memory, a display and/or other user interface components such as a keyboard, a touch screen display, a mouse, a track-pad, a digital camera and/or any number of supplemental devices to add functionality.

Physical computer system 12 is coupled to storage controller 120 through data connections 101 and/or physical computer system 20 is coupled to storage controller 120 through data connections 102.

Storage devices 130 is coupled to storage controller 120 through connections 103. Connections 103 are sometimes called data connections, but typically convey commands in addition to data, and optionally convey metadata, error correction information and/or other information in addition to data values to be stored in storage devices 130 and data values read from storage devices 130. In some embodiments, however, storage controller 120 and storage devices 130 are included in the same physical computer system, as components thereof. Storage devices 130 may include any number (i.e., one or more) of storage devices 131, 132, 133, including, without limitation, non-volatile semiconductor storage devices, such as flash memory storage devices.

Storage devices 130 is divided into a number of addressable and individually selectable blocks. In some embodiments, the individually selectable blocks are the minimum size erasable units in a flash memory storage device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

For example, one block comprises any number of pages, for example, 64 pages, 128 pages, 256 pages or another suitable number of pages. The blocks may be grouped into a plurality of storage pools 141, 142, 143. Each storage pool 141, 142, 143. can be independently managed, which may increase the degree of parallelism for parallel operations and may simplify management of storage devices 130. Each storage pool 141, 142, 143 may logically span across a single storage device or may logically span across multiple storage devices, as depicted. Each storage pool 141, 142, 143 may logically span across a single type of storage device or may logically span across multiple or different types of storage devices.

In some embodiments, storage controller 120 includes a management module 121, one or more input/output buffer(s) 123, and a storage medium interface (I/O) 128. Storage controller 120 may include various additional features that have not been illustrated for the sake of brevity and so as not to obscure more pertinent features of the example embodiments disclosed herein, and that a different arrangement of features may be possible. Input and output buffer(s) 123 provide an interface to physical computer system 12, 20 through data connections 101, 102, respectively. Similarly, storage medium I/O 128 provides an interface to storage devices 130 though connections 103. In some embodiments, storage medium I/O 128 includes read and write circuitry, including circuitry capable of providing reading signals to storage devices 130 (e.g., reading threshold voltages for NAND-type flash memory).

In some embodiments, management module 121 includes one or more processing units (CPUs, also sometimes called processors) 122 configured to execute instructions in one or more programs (e.g., in management module 121). In some embodiments, one or more CPUs 122 are shared by one or more components within, and in some cases, beyond the function of storage controller 120. Management module 121 is coupled to input/output buffer(s) 123 and storage medium I/O 128 in order to coordinate the operation of these components.

During a write operation, input buffer(s) 123 receives data to be stored in storage devices 130 from a host. The data is accumulated until a block-size worth of data is held in input buffer(s) 123. The block-size worth of data is made available to storage medium I/O 128, which transfers the block-size worth of data to a block in storage devices 130.

A read operation is initiated when a host sends one or more host read commands (e.g., via data connections 101) to storage controller 120 requesting data that is stored in storage devices 130. Storage controller 120 sends one or more read access commands to storage devices 130, via storage medium I/O 128, to obtain raw read data in accordance with memory locations (addresses) specified by the one or more host read commands. Storage medium I/O 128 provides the read data to output buffer 124, where the data is made available to the requesting host.

Figure 2:
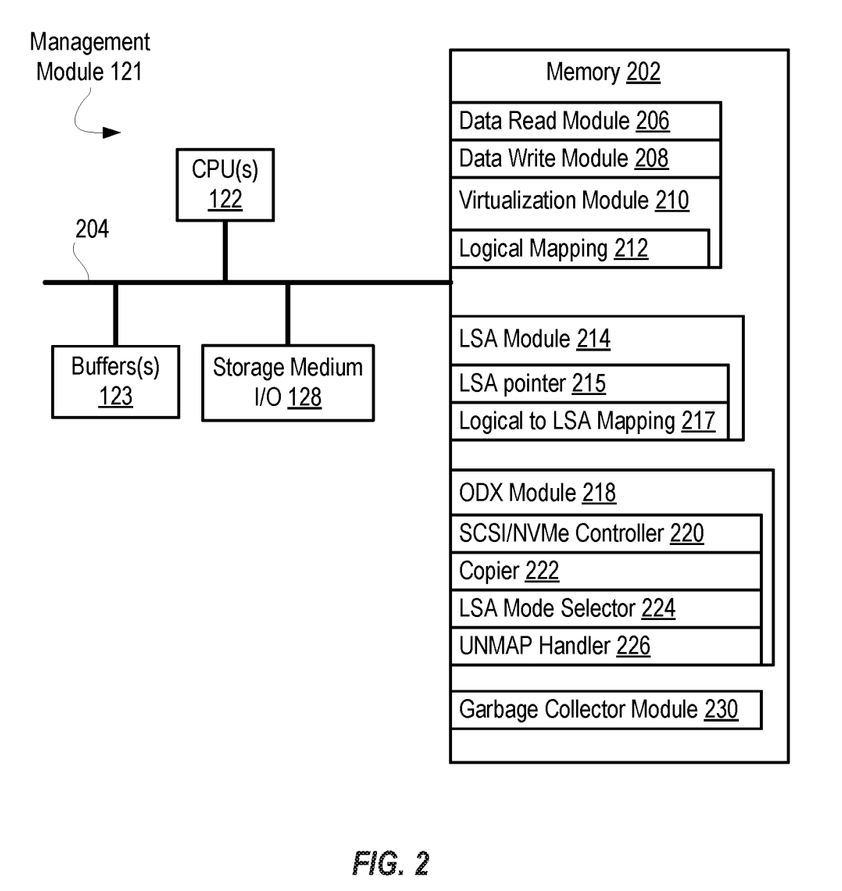
FIG. 2 is a block diagram illustrating an implementation of a management module in accordance with some embodiments.

FIG. 2 is a block diagram illustrating an exemplary management module 121 in accordance with some embodiments. Management module 121 may include: one or more processing units (CPUs) 122 for executing modules, programs and/or instructions stored in memory 202 and thereby performing processing operations; memory 202; and one or more communication buses 204 for interconnecting these components. One or more communication buses 204, optionally, include circuitry (sometimes called a chipset)

that interconnects and controls communications between components that are connected by bus 204. Management module 121 is coupled to buffer(s) 123 and storage medium I/O 128 by one or more communication buses 204. Memory 202 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 202, optionally, includes one or more storage devices remotely located from the CPU(s) 122. Memory 202, or alternatively the non-volatile memory device(s) within memory 202, comprises a computer readable storage medium. In some embodiments, memory 202, or the computer readable storage medium of memory 202, stores the following programs, modules, and data structures, or a subset or superset thereof:

a data read module 206 for reading data from storage devices 130;

a data write module 208 for writing a block-size worth of data to a block of storage devices 130;

a virtualization module 210 for logically separating storage devices 130 storage devices 131, 132, and 133 and provisioning them appropriately so they can be used by a host, including:
  a) a logical mapping 212 that maps host data location(s) to logical block addressing (LBA) locations of storage devices 130 storage device(s) 131, 132, and/or 133;

a LSA module 214 for dividing or grouping blocks of storage devices 130 into a LSA, including:
  a) a block pointer 216 that points to a block of a LSA of the storage devices 130 so as to write data thereto; and
  b) a LBA location mapping 217 that maps LBA locations of the storage devices 130 to blocks of LSAs.

a ODX module 218 for managing ODX Offload Copy and UNMAP instructions from a host, including:
  a) a SCSI/NVMe controller 220 to receive and send ODX instructions to a host;
  b) a data copier 222 to copy data from a source location to a target location within the storage devices 130;
  c) a LSA mode selector 224 to determine whether a received ODX Offload Copy instruction is associated with a data copy operation or is associated with a data migration operation;
  d) a UNMAP handler 226 that manages the ODX UNMAP instruction;

a garbage collection module 230 for performing garbage collection operations upon LSAs within the storage devices 130;

Each of the above identified elements may be stored in one or more of the previously mentioned memory devices and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 202 may store a subset of the modules and data structures identified above. Furthermore, memory 202 may store additional modules and data structures not described above. In some embodiments, the programs, modules, and data structures stored in memory 202, or the computer readable storage medium of memory 202, provide instructions for implementing any of the methods described below with reference to FIG. 4 and FIG. 6. In some embodiments, some or all of these modules may be implemented with specialized hardware circuits that subsume part or all of the module functionality.

Although FIG. 2 shows a management module 121, FIG. 2 is intended more as functional description of the various features which may be present in a management module than as a structural schematic of the embodiments described herein. In practice, and as recognized by those of ordinary skill in the art, the programs, modules, and data structures shown separately could be combined and some programs, modules, and data structures could be separated.

Figure 3A:
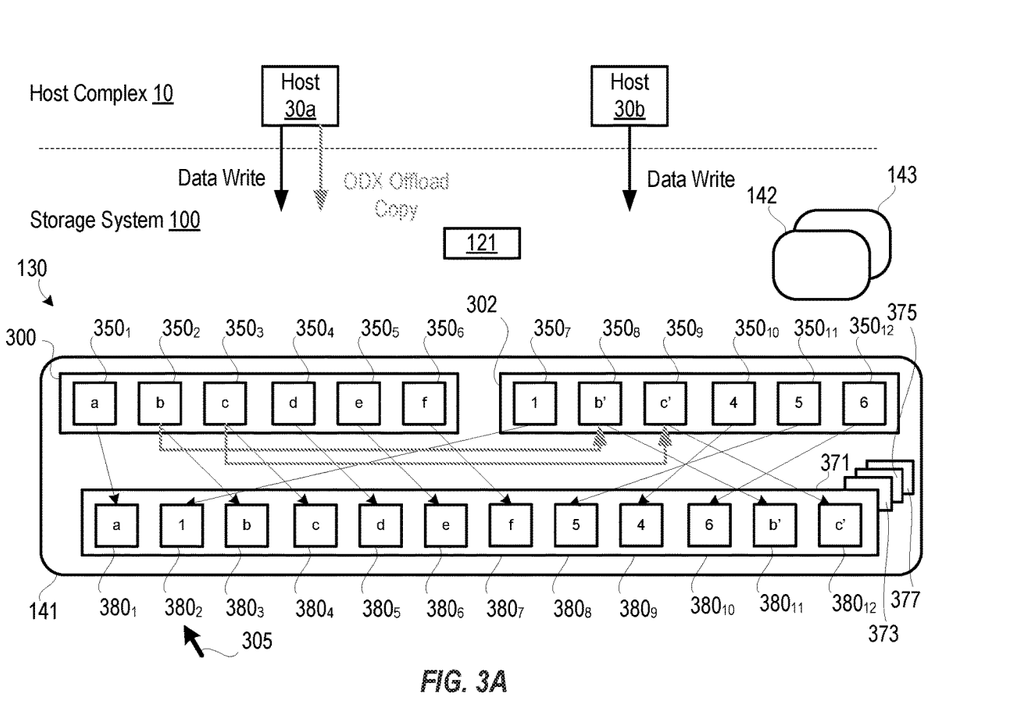
FIG. 3A and FIG. 3B are block diagrams illustrating an ODX between hosts in accordance with some embodiments.
Figure 3B:
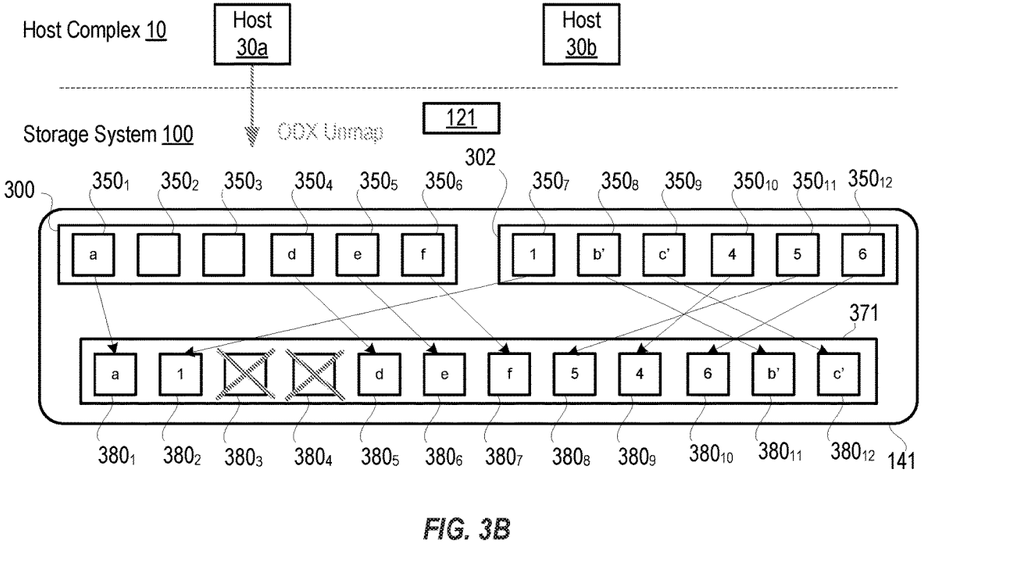

FIG. 3A and FIG. 3B illustrates an ODX data migration operation between host 30a and host 30b in accordance with some embodiments. Host 30a, 30b are different iterations of a physical computer system or different iterations of VMs that store data to and read data from storage system 100. For example, host 30a is computer 12 and host 30b is computer 20, host 30a is VM 14 and host 30b is VM 16, host 30a is VM 14 and host 30b is VM 22, or the like.

Storage devices 130 may be divided into a number of logical storage pools 141, 142, 143 by virtualization module 210. Module 210 logically separates physical storage devices 131, 132, 133 storage resources and provisions them appropriately so they can be used by one or more hosts 30 via logical mapping 212. Logical mapping 212 may map, utilizing known techniques in the art, one or more host 30 storage locations to one or more storage pools 141, 142, 143. In the depicted example, both host 30a, 30b are mapped by logical mapping 212 to storage pool 141. Because of this exemplary logical mapping 212, both host 30a and host 30b write data to and read data from the same storage pool 141. The term map is defined herein as linking applicable locations, point to/from applicable locations, or the like. Similarly, the term unmap is defined herein as unlinking applicable locations, removing the pointer to/from applicable locations, or the like.

Logical mapping 212 may further map, utilizing known techniques in the art, one or more host 30 storage locations to one or more virtual volumes (LUN) and/or to one or more logical block addressing (LBA) locations of a LUN. In the depicted example, host 30a is mapped by logical mapping 212 to LUN 300 and host 30b is mapped by logical mapping 212 to a different LUN 302 within the same storage pool 141. Each LUN 300, 302 includes a predetermined number of LBA locations. In the depicted example, LUN 300 includes LBA locations $350_1$, $350_2$, $350_3$, $350_4$, $350_5$, and $350_6$ and LUN 302 includes LBA locations $350_7$, $350_8$, $350_9$, $350_{10}$, $350_{11}$, and $350_{12}$.

The blocks of storage devices 130 are divided or grouped into a number of LSAs 371, 373, 375, 377, etc. The term LSA is herein defined as an array of storage device storage medium blocks in which block-size worth of data chunks are sequentially written. Sequentially written is defined herein as a writing scheme to the LSA such that the block-size worth of data are written to the next nearest neighboring available blocks in ordered sequence. In a particular scheme, upon data being stored in a block of the LSA, block pointer 305 points is moved to the next or nearest sequential available block to indicate the location in the LSA for the next write. In this manner, block-size worth of data chunks are sequentially written to LSAs. In the depicted example, LSA 371 includes block $380_1$ through block $380_{12}$.

In a particular implementation, a LSA may be wholly contained within a single storage device. In alternative implementation, a LSA may be partially contained within a first storage device and partially contained within a second storage device.

When data is logically written to an LBA location and stored in a block, LBA location mapping 217 maps the LBA location to the block in which the data was stored. A single LSA may be mapped to LBA locations of different LUNs by LBA location mapping 217. For example, LBA locations of LUN 300 and LBA locations of LUN 302 is mapped by LBA location mapping 217 to the same LSA 371. That is, data logically written to respective LBA locations of LUN 300 (from host 30a) and LUN 302 (from host 30b) may be stored in blocks of the same LSA 371.

LBA location mapping 217 may specify LBA locations of different LUNs are to be exclusively mapped to a particular LSA. In this manner, such LUNs may be preassigned to the same LSA prior to any writes thereto. For example, the LBA locations of LUN 300 and the LBA locations of LUN 302 are preassigned by LBA location mapping 217 to be only mappable (i.e. having the ability to be mapped) to the LBA blocks of LSA 371. The LBA locations of LUN 300, 302 would therefore be configured to be exclusively mappable to LSA 371 and therefore could not be mappable to LBA blocks of other LSAs 373, 375, 377, etc.

In an exemplary initial write, input buffer(s) 123 receives data to be logically stored in LBA location $350_1$ from host 30a. The data is accumulated until a block-size worth of data (i.e., data "a") is held in input buffer(s) 123. Management module 121 determines the location that which block pointer 305 is pointing (i.e., volume $380_1$) and transfers data "a" to block $380_1$ via storage medium I/O 128. Subsequent to this write, LBA location mapping 217 maps LBA location $350_1$ to volume $380_1$ and LSA module 214 moves block pointer 305 to the sequential block $380_2$.

In a next write, input buffer(s) 123 receives data to be logically stored in LBA location $350_7$ from host 30b. The data is accumulated until a block-size worth of data (i.e., data "1") is held in input buffer(s) 123. Management module 121 determines the location that which block pointer 305 is pointing (i.e., volume $380_2$) and transfers data "1" to block $380_2$ via storage medium I/O 128. Subsequent to this write, LBA location mapping 217 maps LBA location $350_7$ to volume $380_2$ and LSA module 214 moves block pointer 305 to the sequential block $380_3$.

In a subsequent write, input buffer(s) 123 receives data to be logically stored in LBA location $350_2$ from host 30a. The data is accumulated until a block-size worth of data (i.e., data "b") is held in input buffer(s) 123. Management module 121 determines the location that which block pointer 305 is pointing (i.e., volume $380_3$) and transfers data "b" to block $380_3$ via storage medium I/O 128. Subsequent to this write, LBA location mapping 217 maps LBA location $350_2$ to volume $380_3$ and LSA module 214 moves block pointer 305 to the sequential block $380_4$.

In a next write, input buffer(s) 123 receives data to be logically stored in LBA location $350_3$ from host 30a. The data is accumulated until a block-size worth of data (i.e., data "c") is held in input buffer(s) 123. Management module 121 determines the location that which block pointer 305 is pointing (i.e., volume $380_4$) and transfers data "c" to block $380_4$ via storage medium I/O 128. Subsequent to this write, LBA location mapping 217 maps LBA location $350_3$ to volume $380_4$ and LSA module 214 moves block pointer 305 to the sequential block $380_5$.

In a subsequent write, input buffer(s) 123 receives data to be logically stored in LBA location $350_4$ from host 30a. The data is accumulated until a block-size worth of data (i.e., data "d") is held in input buffer(s) 123. Management module 121 determines the location that which block pointer 305 is pointing (i.e., volume $380_5$) and transfers data "d" to block $380_5$ via storage medium I/O 128. Subsequent to this write, LBA location mapping 217 maps LBA location $350_4$ to volume $380_5$ and LSA module 214 moves block pointer 305 to the sequential block $380_6$.

In a next write, input buffer(s) 123 receives data to be logically stored in LBA location $350_5$ from host 30a. The data is accumulated until a block-size worth of data (i.e., data "e") is held in input buffer(s) 123. Management module 121 determines the location that which block pointer 305 is pointing (i.e., volume $380_6$) and transfers data "e" to block $380_6$ via storage medium I/O 128. Subsequent to this write, LBA location mapping 217 maps LBA location $350_5$ to volume $380_6$ and LSA module 214 moves block pointer 305 to the sequential block $380_7$.

In a subsequent write, input buffer(s) 123 receives data to be logically stored in LBA location $350_6$ from host 30a. The data is accumulated until a block-size worth of data (i.e., data "f") is held in input buffer(s) 123. Management module 121 determines the location that which block pointer 305 is pointing (i.e., volume $380_7$) and transfers data "f" to block $380_7$ via storage medium I/O 128. Subsequent to this write, LBA location mapping 217 maps LBA location $350_6$ to volume $380_7$ and LSA module 214 moves block pointer 305 to the sequential block $380_8$.

In a next write, input buffer(s) 123 receives data to be logically stored in LBA location $350_{11}$ from host 30b. The data is accumulated until a block-size worth of data (i.e., data "5") is held in input buffer(s) 123. Management module 121 determines the location that which block pointer 305 is pointing (i.e., volume $380_8$) and transfers data "5" to block $380_8$ via storage medium I/O 128. Subsequent to this write, LBA location mapping 217 maps LBA location $350_{11}$ to volume $380_8$ and LSA module 214 moves block pointer 305 to the sequential block $380_9$.

In a subsequent write, input buffer(s) 123 receives data to be logically stored in LBA location $350_{10}$ from host 30b. The data is accumulated until a block-size worth of data (i.e., data "4") is held in input buffer(s) 123. Management module 121 determines the location that which block pointer 305 is pointing (i.e., volume $380_9$) and transfers data "4" to block $380_9$ via storage medium I/O 128. Subsequent to this write, LBA location mapping 217 maps LBA location $350_{10}$ to volume $380_9$ and LSA module 214 moves block pointer 305 to the sequential block $380_{10}$.

In a next write, input buffer(s) 123 receives data to be logically stored in LBA location $350_{12}$ from host 30b. The data is accumulated until a block-size worth of data (i.e., data "6") is held in input buffer(s) 123. Management module 121 determines the location that which block pointer 305 is pointing (i.e., volume $380_{10}$) and transfers data "6" to block $380_{10}$ via storage medium I/O 128. Subsequent to this write, LBA location mapping 217 maps LBA location $350_{12}$ to volume $380_{10}$ and LSA module 214 moves block pointer 305 to the next sequential block $380_{11}$.

In a traditional ODX data migration operation, as is described and depicted in FIG. 3A and in FIG. 3B, an ODX for data "b" and data "c" to copy data from host 30a to host 30b is initiated by an Offload Copy instruction sent by host 30a, as shown in FIG. 3A and is followed up by host 30a sending the UNMAP source instruction, as shown in FIG. 3B.

Here, the Offload Copy and UNMAP instructions are associated with data stored in the same LSA 371. In this case, the source location and target location are part of the same storage pool 141 and the copy occurs within the same LSA 371 and within the same storage pool 141.

When the ODX Offload Copy instruction is received by SCSI/NVMe controller 220, the LBA locations associated with the ODX Offload Copy instruction source location and target location are determined. For example, from the ODX Offload Copy instruction to copy data "b", SCSI/NVMe controller 220 determines the LBA location $350_2$ as the source LBA location and determines the LBA location $350_8$ as the target LBA location. LBA location mapping 217 is utilized to determine the source block $380_3$ associated therewith. Copier 222 copies data "b" at block $380_3$ and moves the copy of data b, herein referred to as data b', to the volume identified by block pointer 305 (i.e., block $380_{11}$). Subsequent to this copy, LBA location mapping 217 maps LBA location $350_8$ to volume $380_{11}$, LSA module 214 moves block pointer 305 to the next sequential block $380_{12}$, and SCSI/NVMe controller 220 sends a Copy Offload success acknowledgement to the instructing host 30a.

Subsequent to the receipt of the success acknowledgement, host 30a sends the ODX UNMAP instruction to storage controller 120. When the ODX UNMAP instruction is received by SCSI/NVMe controller 220, the LBA location associated with the ODX UNMAP instruction are determined. For example, from the ODX UNMAP instruction, UNMAP handler 226 determines the LBA location $350_2$ is to be unmapped. In turn, UNMAP handler 226 unmaps LBA location $350_2$ from volume $380_3$ in LBA location mapping 217, data b is deleted from LBA location $350_2$, and SCSI/NVMe controller 220 sends a UNMAP success acknowledgement to the instructing host 30a.

Similarly, when the ODX Offload Copy instruction to copy data c is received by SCSI/NVMe controller 220, SCSI/NVMe controller 220 determines the LBA location $350_3$ as the source location and determines the LBA location $350_9$ as the target location. LBA location mapping 217 is utilized to determine the source block $380_4$ associated therewith. Copier 222 copies data "c" at block $380_4$ and moves the copy of data c, herein referred to as data c', to the volume identified by block pointer 305 (i.e., block $380_{12}$). Subsequent to this copy, LBA location mapping 217 maps LBA location $350_9$ to volume $380_{12}$, LSA module 214 moves block pointer 305 to the next sequential block (not shown), and SCSI/NVMe controller 220 sends a Copy Offload success acknowledgement to the instructing host 30a.

Subsequent to the receipt of the success acknowledgement, host 30a sends the ODX UNMAP instruction to storage controller 120. When the ODX UNMAP instruction is received by SCSI/NVMe controller 220, the LBA location associated with the ODX UNMAP instruction is determined. For example, from the ODX UNMAP instruction, UNMAP handler 226 determines the LBA location $350_3$ to be unmapped. In turn, UNMAP handler 226 unmaps LBA location $350_3$ from volume $380_4$ in LBA location mapping 217, data c is deleted from LBA location $350_3$, and SCSI/NVMe controller 220 sends a UNMAP success acknowledgement to the instructing host 30a.

Due to the unmapping of LBA location $350_2$ to block $380_3$ and unmapping of LBA location $350_3$ to block $380_4$, empty positions, or holes, denoted by x's, are created in LSA 371. These holes are generally not able to be utilized for further data storage until known garbage collection operations by garbage collector module 230 are completed. Therefore, in accordance with the embodiments, a scheme to manage ODX data migrations within the same LSA to reduce the propensity of hole formation is further described below.

Figure 4:
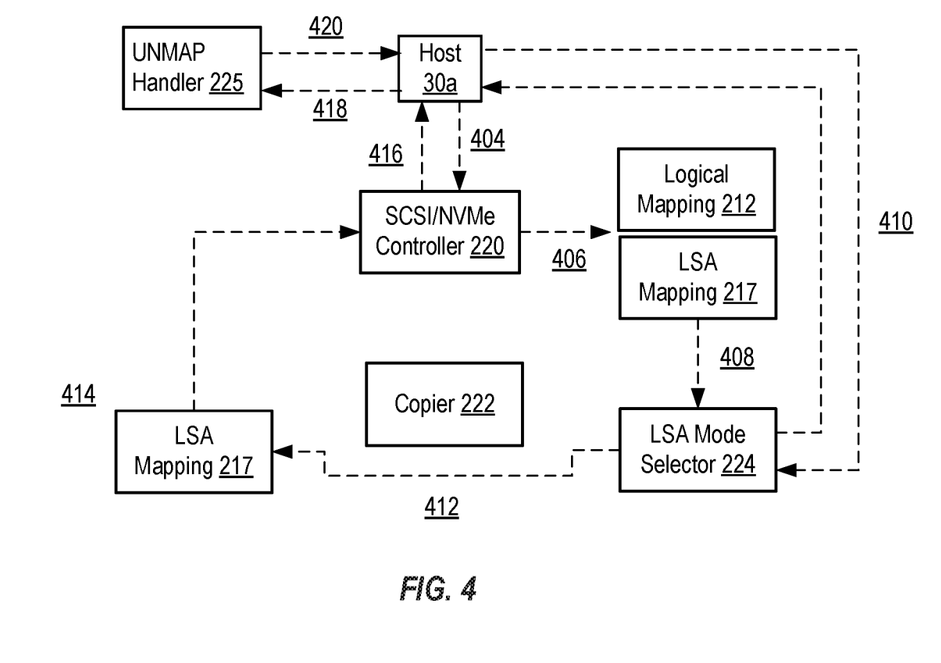
FIG. 4 is a block diagram illustrating a control scheme to implement an ODX in accordance with some embodiments.
Figure 5:
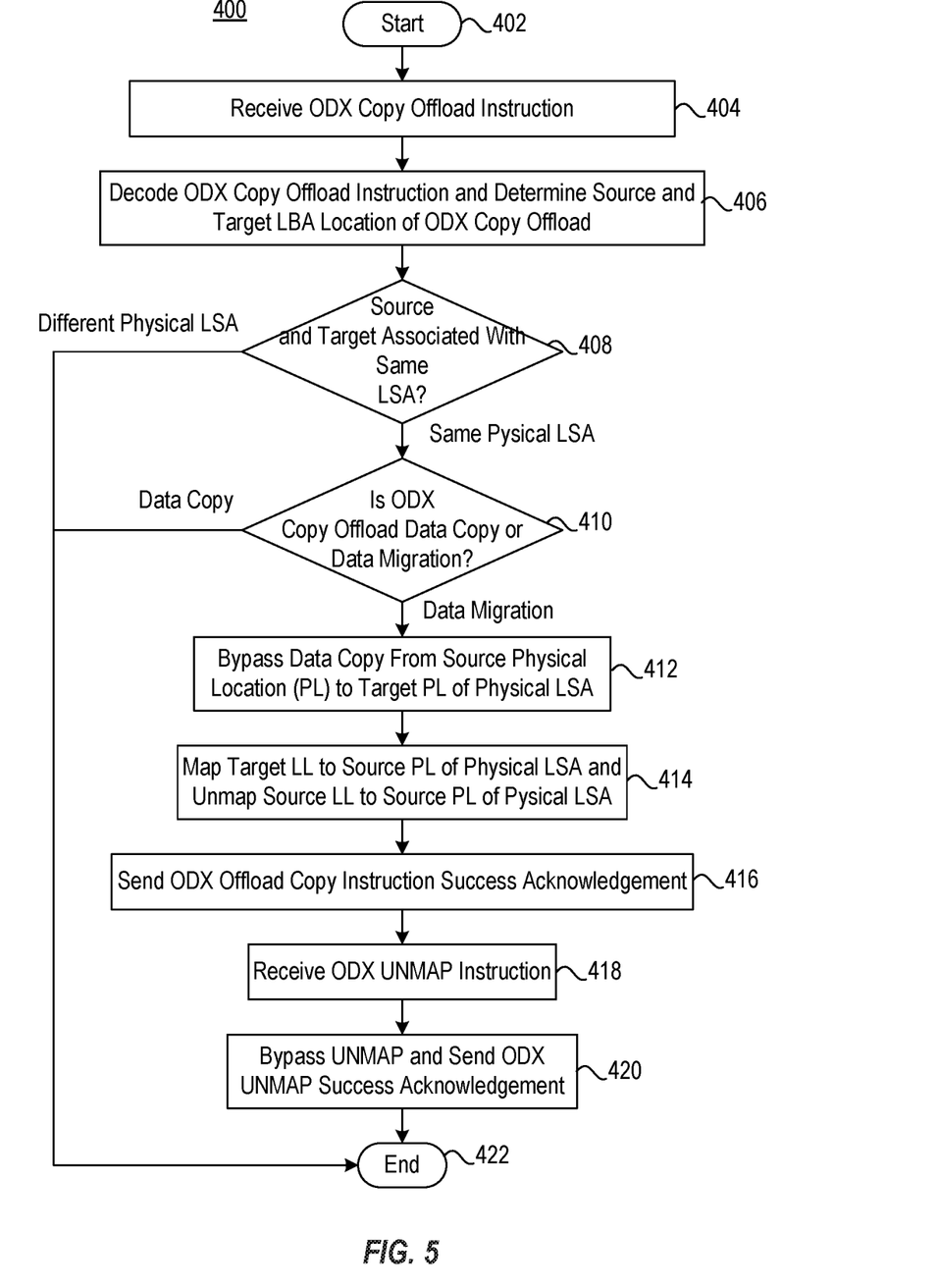
FIG. 5 illustrates flowchart representations of a method of an ODX data migration in a LSA in accordance with some embodiments.

Please refer to both FIG. 4 and FIG. 5, in which FIG. 4 is a block diagram that illustrates a control scheme to manage ODX data migrations within the same LSA and FIG. 5 that illustrates method 400 to manage ODX data migrations within the same LSA. Method 400 may be utilized by management module 121 of storage controller 120. In a particular implementation, method 400 may be utilized by CPU(s) 122 of management module evoking one or more module program instructions stored in memory 202 which cause the storage controller 120 to perform the various functions described.

Method 400 begins at block 402 and continues with receiving an ODX Offload Copy instruction from a host (block 404). As is known in the art, the ODX Offload Copy instruction includes an instruction to copy data at a source location to a target location. For example, SCSI/NVMe controller 220 receives an ODX Offload Copy instruction from host 30a.

Method 400 may continue with decoding the ODX copy instruction to determine the source LBA location and the target LBA location (block 406). For example, management module 121 decodes the received ODX Offload Copy instruction and determines the source LBA location $350_2$ and determines the target LBA location $350_8$. This determination may be made by the management module 121 mapping the source location specified in the ODX Copy Offload instruction to its associated LBA location (e.g., LBA location $350_2$) in logical mapping 212 and by mapping the target location specified in the ODX Copy Offload instruction to its associated LBA location (e.g., LBA location $350_8$) with logical mapping 212.

Method 400 may continue with determining whether the source LBA location and the target LBA location are associated with the same LSA (block 408). For example, management module 121 determines whether LBA location $350_2$ and LBA location $350_8$ are both associated with the same LSA 371. This determination may be made by the management module 121 mapping the LBA location $350_2$ to its associated LSA and mapping the LBA location $350_8$ to its associated LSA with LBA location mapping 217 and comparing the specified or associated LSAs.

Method 400 may end at block 422 if the source LBA location and the target LBA location are associated with different LSAs. Alternatively, if the source LBA location and the target LBA location are associated with the same LSA, method 400 may continue by determining whether the ODX Offload Copy instruction is associated with a data copy operation or associated with a data migration operation (block 410). For example, LSA mode selector 224 sends a query to host 30a asking whether the ODX Copy Offload instruction is associated with a data copy operation (e.g., an UNMAP instruction will not follow) or associated with a data migration operation (e.g., an UNMAP instruction will follow). In response to the sent query, LSA mode selector 224 receives a query response from the host 30a that specifies whether the ODX Copy Offload instruction is associated with a data copy operation or data migration operation.

The communication between LSA mode selector 224 and the host may utilize a non SCSI/NVMe protocol utilizing connections 101, 102, or the like. If the query/query response communications utilize the SCSI protocol, LSA mode selector 224 functions may be integrated into the SCSI/NVMe controller 220. Fields in the SCSI Command Descriptor Block (CBD) may house or contain the query and query response, respectively. As is known, CDB is a block of data that describes an associated command. Each CDB can be 6, 10, 12, 16, or variable length byte-length. The CBD consists of a one byte operation code followed by some command specific parameter bytes. These parameters need not be a full byte long and may house or otherwise contain the query from SCSI/NVMe controller 220 and the return query response from host 30a.

Similarly, if the query/query response utilize the Non-Volatile Memory Host Controller Interface Specification (NVMe) protocol, LSA mode selector 224 functions may be integrated into the SCSI/NVMe controller 220 to pass and receive NVMe messages to/from the host. If the NVMe protocol is utilized, a known type of NVMe command, such as, an AER Command, may house or contain the query and query response, respectively.

Method 400 may end at block 422 if the ODX Offload Copy instruction is associated with a data copy operation. Alternatively, method 400 may continue with bypassing the copying of data from the associated source LSA block to an LSA block that which pointer 305 is pointing, if the ODX Offload Copy instruction is associated with a data migration operation. For example, the copying of data from the associated source LSA block to an LSA block that which pointer 305 is pointing by copier 222 is bypassed.

Method 400 may continue with mapping the target LBA location to the source LSA block and unmapping the source LBA location from the source LSA block (block 414). For example, management module 121 maps the target LBA location $350_8$ to the LSA block $380_3$ that was previously associated with the source LBA location $350_2$ and unmaps the source LBA location $350_2$ from this source LSA block $380_3$ in LBA location mapping 217.

Method 400 may continue with sending an ODX Offload Copy Instruction Success Acknowledgment to the requesting host (block 416). For example, upon the completion of mapping and/or unmapping of block 414, SCSI/NVMe controller 220 sends the ODX Offload Copy Success Acknowledgement to host 30a.

Method 400 may continue with receiving an ODX UNMAP instruction associated with the previous ODX Offload Copy Instruction to migrate data (block 418). to the requesting host (block 416). As is known in the art, the ODX UNMAP instruction is associated with a previous ODX Offload Copy instruction to indicate a data migration and to indicate that the source data has been migrated and is presently unneeded. For example, UNMAP Handler 225 receives an ODX UNMAP instruction from host 30a.

Method 400 may continue with bypassing ODX UNMAP operations and sending an ODX UNMAP Success Acknowledgement to the requesting host (block 420). When the ODX UNMAP instruction is received by SCSI/NVMe controller 220, instead of the Unmap Handler 226 traditionally determining the LBA location (i.e. source location) associated with the ODX UNMAP instruction and unmapping this location from the source LSA block in LBA location mapping 217, Unmap Handler 226 bypasses these assocaited operations. Subsequent to the bypassing of block 420, the SCSI/NVMe controller 220 may send a UNMAP success acknowledgement to the instructing host 30a.

If the ODX UNMAP and/or UNMAP success acknowledgement instruction communications utilize the SCSI protocol, UNMAP Handler 225 functions may be integrated into the SCSI/NVMe controller 220. Similarly, if the ODX UNMAP and/or UNMAP success acknowledgement instruction utilize the NVMe protocol, UNMAP Handler 225 functions may be integrated into the SCSI/NVMe controller 220.

Method 400 may end at block 422.

Figure 6:
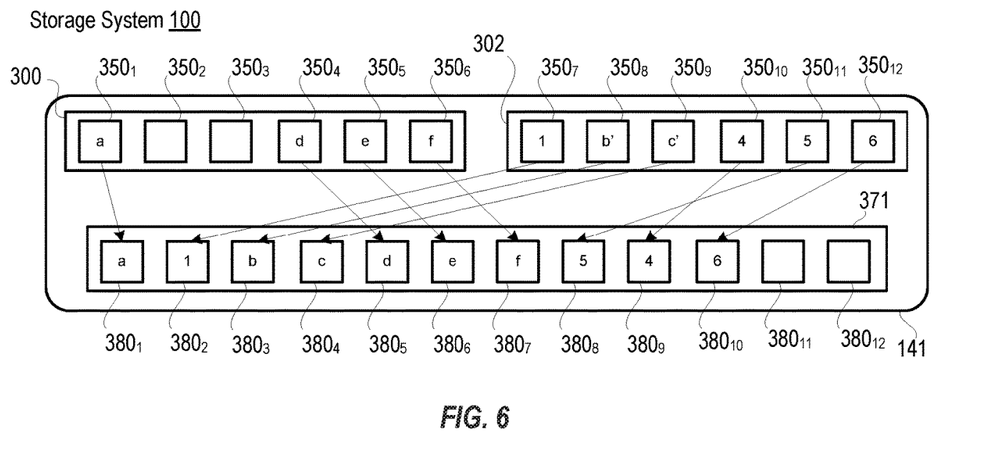
FIG. 6 are block diagrams illustrating an ODX between hosts in accordance with some embodiments.

FIG. 6 are block diagrams illustrating an exemplary result of an ODX between hosts 30a, 30b. implementing one or more embodiments. The exemplary result depicted in FIG. 6 utilizes data initially stored in storage system 100 as depicted in FIG. 3A and the embodiments described herein to migrate a portion of that data while reducing the propensity of hole formation in the associated LSA.

The exemplary data migration beings with SCSI/NVMe controller 220 receiving an ODX Offload Copy instruction from host 30a. Management module 121 decodes the received ODX Offload Copy instruction and determines data "b" at source LBA location $350_2$ within LUN $300_1$ (associated with host 30a) should be copied to target LBA location $350_8$ within LUN $300_2$ (associated with host 30b). This determination may be made by the management module 121 mapping the source location specified in the ODX Copy Offload instruction to its associated LBA location (e.g., LBA location $350_2$) in logical mapping 212 and by mapping the target location specified in the ODX Copy Offload instruction to its associated LBA location (e.g., LBA location $350_8$) with logical mapping 212. In the exemplary data migration, the same or a supplementary ODX Offload Copy instruction is also received by SCSI/NVMe controller 220 from host 30a that specifies data "c" at source LBA location $350_3$ within LUN $300_1$ (associated with host 30a) should be copied to target LBA location $350_9$ within LUN $300_2$ (associated with host 30b).

Subsequently, management module 121 determines that LBA location $350_2$ and LBA location $350_8$ are both associated with the same LSA 371. Similarly, management module 121 determines that LBA location $350_3$ and LBA location $350_9$ are both associated with the same LSA 371. This determination may be made by the management module 121 mapping the LBA location $350_2$ to its associated LSA 371 and mapping the LBA location $350_8$ to its associated LSA 371 with LBA location mapping 217 and comparing the specified or associated LSAs as being the same LSA.

In response to the determination that the source location and target location of the ODX Offload Copy instruction are both associated with the same LSA 371, LSA mode selector 224 sends a query to the instructing host 30a. The query asks the host 30a whether the ODX Copy Offload instruction is associated with a data copy operation (e.g., an UNMAP instruction will not follow) or associated with a data migration operation (e.g., an UNMAP instruction will follow). In the exemplary query response, the host 30a sends a query response that specifies that the previous associated ODX Copy Offload instruction to migrate data "b" and to migrate data "c" is associated with a data migration operation.

In accordance with the embodiments, with regard to data "b", the traditional copying of data from the associated source LSA block $380_3$ to LSA block $380_{11}$ that which pointer 305 is pointing is bypassed. Similarly, with regard to data "c", the traditional copying of data from the associated source LSA block $380_4$ to LSA block $380_{12}$ that which pointer 305 is pointing is bypassed.

Rather than traditional copying and migrating of data within a LSA block, as depicted in 3B, management module 121 maps the target LBA location $350_8$ to the LSA block $380_3$ that was previously associated with the source LBA location $350_2$ and unmaps the source LBA location $350_2$ from this source LSA block $380_3$ in LBA location mapping 217. This mapping of LBA location $350_8$ to the LSA block $380_3$ effectively copies data b from LBA location $350_2$ to LBA location $350_8$, which is depicted by data b' in FIG. 6. Likewise, the unmapping of LBA $350_2$ from the LSA block $380_3$ effectively deletes data b from LBA location $350_2$.

Similarly, management module 121 maps the target LBA location $350_9$ to the LSA block $380_4$ that was previously associated with the source LBA location $350_3$ and unmaps the source LBA location $350_3$ from this source LSA block $380_3$ in LBA location mapping 217. This mapping of LBA location $350_9$ to the LSA block $380_4$ effectively copies data c from LBA location $350_3$ to LBA location $350_9$, which is indicated by data c' in FIG. 6. Likewise, the unmapping of LBA $350_3$ from the LSA block $380_4$ effectively deletes data c from LBA location $350_3$.

Upon the completion of mapping the target LBA location to the LSA block that was previously associated with the source LBA location and unmapping the source LBA location from this source LSA block, management module 121 sends the ODX Offload Copy Success Acknowledgement to the instructing host. The ODX Offload Copy Success Acknowledgement communication may utilize the SCSI protocol, NVMe protocol, or another appropriate protocol.

Because the associated ODX Offload Copy instruction is associated with a data migration operation, the instructing host sends the storage system 100 the associated ODX UNMAP instruction. As is known in the art, the ODX UNMAP instruction is associated with a previous ODX Offload Copy instruction and indicates a data migration and indicates that the source data has been migrated and is presently unneeded. In this exemplary depiction, UNMAP Handler 225 may receive the ODX UNMAP instruction from host 30a. In turn, the management module 121, UNMAP Handler 225, or the like, bypasses ODX UNMAP operation and sends an ODX UNMAP Success Acknowledgement to the instructing host. In the exemplary depiction, the ODX UNMAP instruction is received by SCSI/NVMe controller 220. The traditional operations of the Unmap Handler 226 determining LBA location $350_2$ and LBA location $350_2$ associated with the ODX UNMAP instruction and unmapping these locations from the respective source LSA block $380_3$, $380_4$, in LBA location mapping 217 are bypassed. Alternatively, in accordance with the embodiments, Unmap Handler 226 may instruct the management module 121 to bypass these associated operations and instruct the SCSI/NVMe controller 220 to send an UNMAP success acknowledgement to the instructing host 30a.

Relative to the traditional hole formation result, depicted in FIG. 3B, due to the unmapping of LBA location $350_2$ to block $380_3$ and unmapping of LBA location $350_3$ to block $380_4$, the number of LSA blocks that are unmapped to a LBA location in LBA location mapping 217 is relatively reduced. In this manner, garbage collection operations are similarly reduced and the overall operational efficiency of storage system 100 is increased.

It is to be understood that the storage system 100 has functionality to differentiate between ODX Offload Copy data copy instructions/operations and ODX Offload Copy data migration instructions/operations. If the storage system 100 determines that an associated ODX Offload Copy is a or will be associated with a data migration operation within the same LSA, the storage system 100 maps the target LBA location to the LSA block that was previously associated with the source LBA location and unmaps the source LBA location from this source LSA block. Such mapping and unmaping effectively copies the data from the source LBA location to the target LBA location without the creation of a hole within the underlying LSA. Because the propensity of hole formation is reduced, corollary garbage collection operations are likewise reduced, and the life span of the storage device 131, 132, 133 is typically increased. It is to be further understood that because the effected data within the LSA block is not moved to a different LSA block within the same LSA, I/O complexities to/from that LSA may be reduced.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A storage system controller comprising:
   one or more processors;
   a host interface comprising a buffer and configured to couple the storage system controller to a first host and to a second host;
   a storage device interface configured to couple the storage system controller to a plurality of block-based storage devices, each with a plurality of blocks, wherein a group of blocks (LSA blocks) are arranged to store data as a log structured array (LSA); and
   a storage controller memory storing instructions, which, when executed by the one or more processors, causes the storage controller to perform operations comprising:
   dividing each of the plurality of block-based storage devices into a first logical unit (LUN) and a second LUN, the first LUN and the second LUN each comprising a plurality of logical block addressing (LBA) locations;
   assigning the first LUN to store data exclusively from the first host and assigning the second LUN to store data exclusively from the second host;
   accumulate, within the buffer, first host write data associated with a first LBA location of the first LUN;
   write a block-size worth of the first host data to a first LSA block that which is pointed to by a LSA block pointer;
   move the LSA block pointer to a sequential LSA block that neighbors and is sequential to the first LSA block;
   map the first LBA location in the first LUN to the first LSA block;
   in response to receiving an ODX Copy Offload instruction from the first host, determine the first host data that is stored at the first LSA block and mapped to the first LBA location should be migrated to a target LBA location in the second LUN and determine the first LUN and the second LUN are exclusively mappable to the LSA;
   map the target LBA location in the second LUN to the first LSA block; and
   unmap the first LBA location in the first LUN from the first LSA block.

2. The storage system controller of claim 1, wherein the group of LSA blocks of the LSA are sequential neighboring blocks.

3. The storage system controller of claim 1, wherein the instructions, which, when executed by the one or more processors, causes the storage controller to determine the first host data that is stored at the first LSA block and mapped to the first LBA location should be migrated to the target LBA location in the second LUN comprises:
   in response to receiving the ODX Copy Offload instruction from the first host, send the first host a query whether the ODX Copy Offload instruction is associated with a data migration operation or whether the ODX Copy Offload instruction is associated with a data copy operation.

4. The storage system controller of claim 1, wherein the instructions, which, when executed by the one or more processors, cause the storage controller to perform further operations comprising:

bypass copying of the host data that is stored at the first LSA block and bypass storing the copy of the host data at the sequential LSA block at which the LSA block pointer is pointing.

5. The storage system controller of claim 1, wherein the first host is a first computer system and wherein the second host is a second computer system.

6. The storage system controller of claim 1, wherein the first host is a first virtual machine and wherein the second host is a second virtual machine.

7. The storage system controller of claim 2, wherein the group of LSA blocks of the LSA are located in the same block-based storage device.

8. A storage system controller method comprising:
dividing each of a plurality of block-based storage devices into a first logical unit (LUN) and a second LUN, the first LUN and the second LUN each comprising a plurality of logical block addressing (LBA) locations;
assigning the first LUN to store data exclusively from a first host and assigning the second LUN to store data exclusively from a second host;
accumulating within a buffer first host write data associated with a first LBA location of the first LUN;
writing a block-size worth of the first host data to a first log structured array (LSA) block that which is pointed to by a LSA block pointer, wherein a group of LSA blocks are arranged to store data as a LSA;
moving the LSA block pointer to a sequential LSA block that neighbors and is sequential to the first LSA block;
mapping the first LBA location in the first LUN to the first LSA block;
in response to receiving an ODX Copy Offload instruction from the first host, determining the first host data that is stored at the first LSA block and is mapped to the first LBA location should be migrated to a target LBA location in the second LUN and determining the first LUN and the second LUN are exclusively mappable to the LSA;
mapping the target LBA location in the second LUN to the first LSA block; and
unmapping the first LBA location in the first LUN from the first LSA block.

9. The storage system controller method of claim 8, wherein the LSA comprises a group of sequentially neighboring LSA blocks.

10. The storage system controller method of claim 8, wherein determining the first host data that is stored at the first LSA block and is mapped to the first LBA location should be migrated to the target LBA location in the second LUN comprises:
in response to receiving the ODX Copy Offload instruction from the first host, sending the first host a query whether the ODX Copy Offload instruction is associated with a data migration operation or whether the ODX Copy Offload instruction is associated with a data copy operation.

11. The storage system controller method of claim 8, further comprising:
bypassing copying of the host data that is stored at the first LSA block and bypassing storing the copy of the host data at the sequential LSA block at which the LSA block pointer is pointing.

12. The storage system controller method of claim 8, wherein the first host is a first computer system and wherein the second host is a second computer system.

13. The storage system controller method of claim 8, wherein the first host is a first virtual machine and wherein the second host is a second virtual machine.

14. The storage system controller method of claim 9, wherein the group of LSA blocks are located in a single block-based storage device.

15. A computer program product to reduce hole formation within a log structured array (LSA) due to ODX Copy Offload data migration operations, the computer program product comprising a computer readable storage medium having program instructions embodied therewith, the program instructions are readable to cause a processor to:
divide each of a plurality of block-based storage devices into a first logical unit (LUN) and a second LUN, the first LUN and the second LUN each comprising a plurality of logical block addressing (LBA) locations;
assign the first LUN to store data exclusively from a first host and assign the second LUN to store data exclusively from a second host;
accumulate within a buffer first host write data associated with a first LBA location of the first LUN;
write a block-size worth of the first host data to a first LSA block of the LSA that which is pointed to by a LSA block pointer, wherein a group of LSA blocks are arranged to store data as a LSA;
move the LSA block pointer to a sequential LSA block that neighbors and is sequential to the first LSA block;
map the first LBA location in the first LUN to the first LSA block;
in response to receiving an ODX Copy Offload instruction from the first host, determine the first host data that is stored at the first LSA block and is mapped to the first LBA location should be migrated to a target LBA location in the second LUN and determine the first LUN and the second LUN are exclusively mappable to the LSA;
map the target LBA location in the second LUN to the first LSA block; and
unmap the first LBA location in the first LUN from the first LSA block.

16. The computer program product of claim 15, wherein the LSA comprises a group of sequentially neighboring LSA blocks.

17. The computer program product of claim 15, wherein the program instructions that are readable to cause the processor to determine the first host data that is stored at the first LSA block and is mapped to the first LBA location should be migrated to the target LBA location in the second LUN, further cause the processor to:
in response to receiving the ODX Copy Offload instruction from the first host, send the first host a query whether the ODX Copy Offload instruction is associated with a data migration operation or whether the ODX Copy Offload instruction is associated with a data copy operation.

18. The computer program product of claim 15, wherein the program instructions are readable to further cause the processor to:
bypass copying of the host data that is stored at the first LSA block and bypass storing the copy of the host data at the sequential LSA block at which the LSA block pointer is pointing.

19. The computer program product of claim 15, wherein the first host is a first computer system and wherein the second host is a second computer system.

20. The computer program product of claim 16, wherein the group of LSA blocks are located in a single block-based storage device.

* * * * *